(12) United States Patent
Garza et al.

(10) Patent No.: US 6,400,119 B1
(45) Date of Patent: Jun. 4, 2002

(54) ENERGY CONSERVING MOTOR CONTROLLER

(75) Inventors: Filiberto D. Garza; Kenneth M. Hankins, both of Odessa, TX (US)

(73) Assignee: Power Conservation, Ltd., Dallas, TX (US)

(*) Notice: Subject to any disclaimer, the term of this patent is extended or adjusted under 35 U.S.C. 154(b) by 0 days.

(21) Appl. No.: 09/426,508

(22) Filed: Oct. 26, 1999

(51) Int. Cl.[7] .............................. H02P 5/28; H02P 7/36
(52) U.S. Cl. ..................... 318/798; 318/729; 318/798; 318/806
(58) Field of Search ................... 318/459, 500, 318/727, 729, 798, 806; 388/928.1

(56) References Cited

U.S. PATENT DOCUMENTS

| | | | | |
|---|---|---|---|---|
| 4,800,326 A | * | 1/1989 | Unsworth | 318/729 |
| 5,682,091 A | * | 10/1997 | Williamson et al. | 318/806 |
| 5,723,966 A | * | 3/1998 | Straka et al. | 318/729 |
| 5,764,021 A | * | 6/1998 | Gutsche | 318/727 |
| 5,923,143 A | * | 7/1999 | Cosan et al. | 318/729 |

* cited by examiner

Primary Examiner—Robert E. Nappi
Assistant Examiner—Marlon Fletcher
(74) Attorney, Agent, or Firm—Jack A. Kanz (57) ABSTRACT

An AC induction motor is controlled by dynamically matching energy use by the motor to the load on the motor. First and second SCRs are connected in parallel with each other in opposing polarities for each phase of the applied AC voltage. A trigger generator couples trigger control signals to the respective gates of the SCRs responsive to the timing of sensed zero-crossing events of the AC voltage and current in the respective phase applied to the motor winding. The first and second SCRs are alternately triggered into a conductive state during each alternation of the applied AC voltage and are alternately inhibited from the conductive state for an interval in time proportional to a measured difference in time between the AC voltage zero-crossing and the corresponding AC current zero-crossing as determined by comparing the time difference between successive first and second interrupts corresponding to the zero-crossing events with a continuously running time base.

35 Claims, 7 Drawing Sheets

ENERGY CONSERVING MOTOR CONTROLLER

BACKGROUND OF THE INVENTION

It is well known that operation of an AC induction motor at substantially less than its full rated load becomes more and more inefficient in use of electrical energy as the power factor of the load, which varies inversely with the load, increases. Numerous methods and devices for reducing energy consumption of AC induction motors have been developed or proposed. One class of such devices and methods uses a measure of the power factor of the load, e.g. an AC induction motor, to generate a control signal used for adjusting the power delivered to the motor. In order to maintain sufficient rotor "slip" for operation with a relatively low power factor and best efficiency, the control signal is adjusted to reduce the average power applied to the motor during light loading.

Various problems occur in the aforementioned prior art devices and methods, particularly when applied to controlling power delivered to AC induction motors which drive pumping units used to extract oil from underground deposits. Such pumping units are alternately loaded by the pumping rods and the opposing counter weights twice each pumping cycle. Moreover, twice each cycle the two opposing loads balance and the motor is thus unloaded twice each cycle. The constantly changing load between peak minimum and maximum values creates severe control difficulties for power factor control systems and methods which must continuously adjust the power delivery to maintain optimum efficiency and economy.

Some of the operational problems with prior art include: (1) systems and methods which, instead of relying on an accurate time base use counters based on imprecise time bases or are subject to drift with temperature, voltage or load or, which are in turn subject to interruption by external signals or interference, typically resulting in inefficient or inappropriate control actions; (2) systems which are susceptible to severe back-EMF effects or other electromagnetic interference generated in the motor or in the controller itself which may substantially interfere with accurate power factor sensing and control or an inability to process sensor parameters or generate unambiguous control signals because of the high interference levels present; (3) systems and methods which only work well when the motors connected to the controller are in good condition, are correctly wired to the power source and/or the controller or do not have significant phase winding irregularities imbalances or mechanically unbalanced loads which typically results in an inability to properly compensate or adjust the power factor or, in some cases, motor failure; (4) systems which must be manually adjusted to accommodate individual application conditions and thus are labor intensive, costly, and may fail to provide optimum adjustment because limited range of adjustment; (5) setting desired power factor parameters by hand or setting average power factors which once set, are fixed and, at best, only approximate the potential efficiency improvement desired from the system; and (6) systems or methods which require complex control circuitry or modification to the motors in order to provide efficient control which also tends to increase the cost of manufacturing, installing or using the systems.

SUMMARY OF THE INVENTION

In accordance with present invention a controller is provided which dynamically matches energy use by an AC induction motor to the load on the motor. First and second SCRs, each having a respective gate, are connected in parallel with each other in opposing polarities between a first node and a second node for each phase of the applied AC voltage. The first node is connected to a source of the applied voltage The second node is connected to at least one winding of the motor. A trigger generator is coupled to the respective gates of the SCRs, to the applied voltage and to the motor winding for controlling each of the first and second SCRs responsive to the respective timing of sensed zero crossing events of the AC voltage and the AC current in the motor winding corresponding to the applied AC voltage. Further, the first and second SCRs are alternately triggered into a conductive state during each alternation of the applied AC voltage and are alternately inhibited from the conductive state for an interval in time proportional to a measured difference in time between the time the AC voltage across the motor winding passes through a first zero-crossing and the time the corresponding AC current in the motor winding passes through a second zero-crossing, wherein the measured difference is determined as the time difference between successive first and second interrupts are coupled to the trigger generator and compared with a continuously running time base.

In one embodiment, the gate drive for the SCRs coupled between the first and second nodes is selectively opened and closed by the control signal provided by the trigger generator.

In another embodiment, the trigger generator comprises a first input for sensing the AC voltage applied to the motor winding; a second input for sensing the AC current in the motor winding corresponding to the AC voltage applied to the motor winding; an output for providing a trigger control signal for controlling each of the first and second SCRs; and a control device including a continuously running time base that is responsive to the first and second interrupts corresponding respectively to the first and second inputs for generating the trigger control signal.

In a preferred embodiment, the control device comprises a measurement system for measuring the elapsed time between the first and second interrupts occurring in a select phase of the applied AC voltage and for calculating the product of the elapsed time and a predetermined factor. The control device includes the capability for generating a trigger control signal, within a first time interval following the zero-crossing of the current in the motor during the select phase of the AC voltage, wherein the trigger control signal has a duration substantially equal to the product of the elapsed time and the predetermined factor; and wherein the first and second gate drive circuits are disabled for the duration of the trigger control signal. Other features and advantages of the invention will become more apparent from the following detailed description taken in connection with the appended claims and attached drawing in which:

DESCRIPTION OF THE PREFERRED EMBODIMENT

Figure 1:
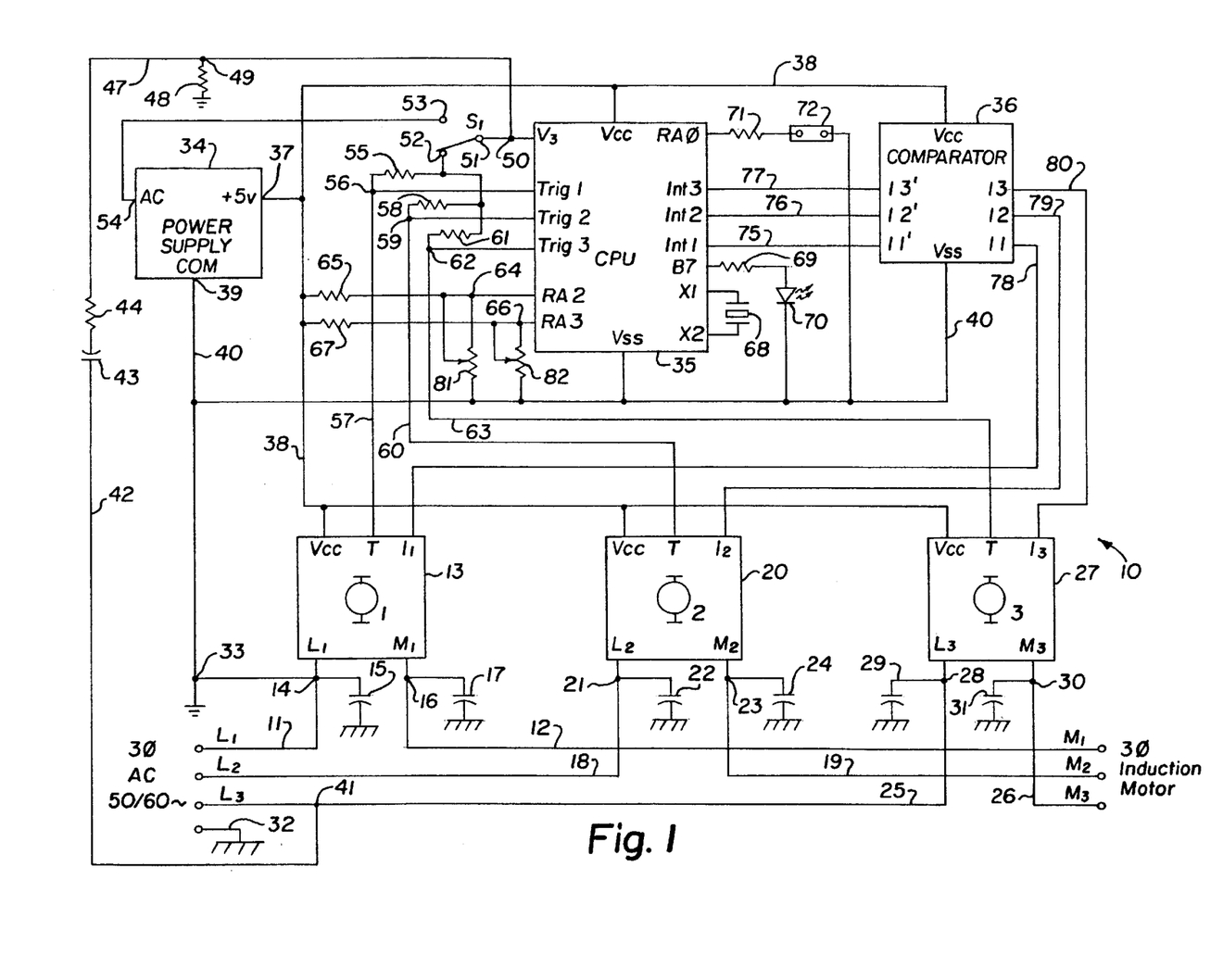
FIG. 1 is a block diagram of an embodiment of a three phase power factor controller according to the present invention.

FIG. 1 illustrated, in a block diagram, one embodiment of a three phase power factor controller according to the present invention. Each phase control section in FIG. 1 is identified with a respective phase by the designation $\Phi 1$, $\Phi 2$, and $\Phi 3$. The individual phase control sections are coupled to and controlled by the combination of a CPU and a composite comparator also shown in FIG. 1 along with a DC power supply to provide the operating voltages for the CPU and the composite comparator. Also shown in FIG. 1 are incoming connections from the three phase AC power source operating at either 50 or 60 Hz as well as the outgoing connections to a three phase induction motor controlled by the power factor controller.

In the power factor controller 10 shown in FIG. 1, the incoming phases of the three phase AC voltage are coupled respectively along lines $L_1$, $L_2$ and $L_3$. Each phase control section includes terminals labeled $L_1$, $M_1$, $I_1$, T and $V_{CC}$. Line $L_1$, identified by reference number 11, is coupled to a node 14 and the $L_1$ terminal of the phase control section $\Phi_1$. Phase control section $\Phi_1$ is identified by reference number 13. Similarly $L_2$, identified as line 18, is coupled to node 21 and to the $L_2$ terminal of phase control section 20 (i.e., $\Phi_2$). Similarly line $L_3$, identified as line 25, is coupled to a node 28 and to terminal L3 of phase control section 27 (i.e., $\Phi_3$). In a similar fashion an AC voltage line is coupled from terminal $M_1$ on phase control section 13 to a node 16 and there along line 12 to terminal $M_1$ for connection to the three phase induction motor. Line 19 is coupled from terminal M2 of phase control section 20 to node 23 and there along line 19 to terminal M2 of the motor. Line 26 couples the M3 terminal of phase control section 27 to node 30 and along line 26 to terminal M3 of the three phase induction motor. FIG. 1 also shows a connection from the incoming AC voltage source to an earth ground terminal identified by the conductive path 32 to the symbol identifying earth ground.

In the three phase system of FIG. 1 (wherein typically each of the three phases is balanced with respect to earth ground) one of the phase voltages is selected as the ground reference for the control circuitry of the power factor controller system. In FIG. 1 the designated control circuit ground reference is connected to line $L_1$ at node 14. This control circuit ground is shown by the ground symbol connected to node 33 which is connected to node 14 in FIG. 1. It will be appreciated that this control circuit ground coupled to node 33 is a floating ground with respect to earth ground in that it assumes the potential existing on line $L_1$ at any given moment in time. This occurs because all the control circuitry which operates at a low voltage is referenced to this particular control circuit ground at node 33 and each of the control or sensing signals are coupled to the phase control sections through isolation circulation. In addition to isolating the high voltage AC from the low voltage control sections, the isolation circuitry also removes any DC component from the signals coupled between the control section and the individual phase control sections.

Figure 2:
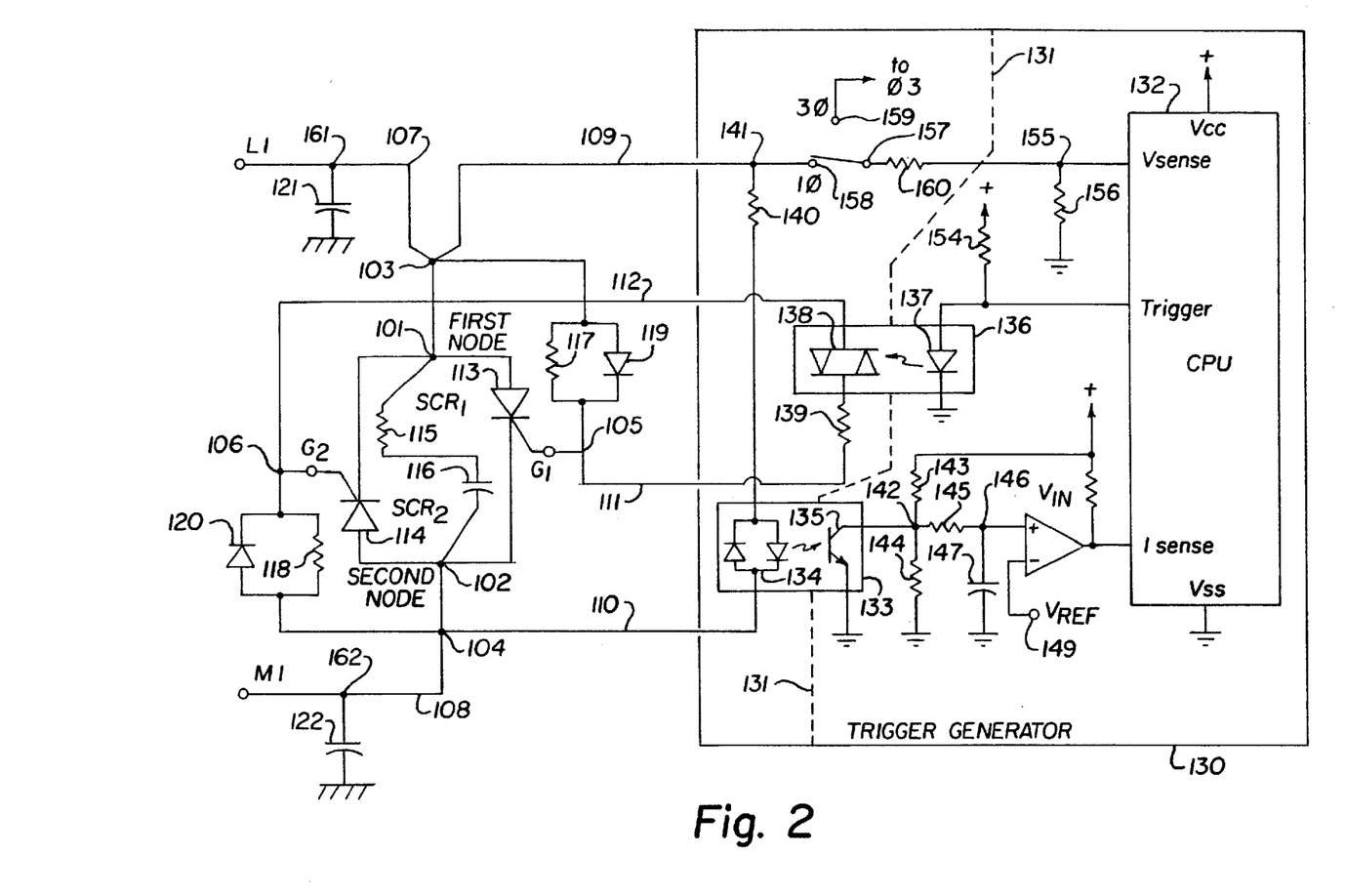
FIG. 2 is a simplified schematic of a power factor controller for a representative phase according to the present invention.

Each phase control section comprises a pair of SCRs for switching the AC voltages to the motor windings. Also included are the gate drive circuitry for controlling switching of the SCRs, zero-crossing sense circuitry for obtaining timing information related to the zero-crossing event of the respective AC voltage and current phases, and the aforementioned high voltage/low voltage isolation present in the control and sense signal lines. Thus, for example, phase control section 13 includes terminals for connections to AC voltage line $L_1$; to the motor voltage line $M_1$; to a DC voltage $V_{CC}$ to part of the isolation circuitry; and to terminal T for trigger control signals and from terminal $I_1$ for sensing the zero-crossing of the current signal. Similarly, phase control section 20 has terminals for connections to line $L_2$, to line $M_2$ to the motor, from the DC voltage supply $V_{CC}$, to terminal T for the trigger control signal and from terminal 12 for the current sense zero-crossing signal. Finally, phase control section 27 similarly includes terminal $L_3$ connected to AC voltage line $L_3$, terminal $M_3$ connecting the phase control section to the motor winding terminal $M_3$, as well as terminals for Vcc, the trigger control signal T and terminal I3 for the current sense zero-crossing signal for $\Phi_3$. It will be observed that connected to nodes 14, 21 and 28 are harmonic suppression capacitors connected between the identified node and earth ground, respectively capacitor 15, capacitor 22 and capacitor 29. In similar fashion nodes 16, 23 and 30 are also coupled to earth ground through harmonic suppression capacitors identified as capacitor 17, capacitor 24 and capacitor 31. Each of these harmonic suppression capacitors absorbs transient energy in the form of line voltage spikes, turn-off transients or other high frequency noise that may exist on the respective AC voltage lines $L_1$, $L_2$ and $L_3$ or on the leads to the motor windings $M_1$, $M_2$ and $M_3$.

FIG. 1 also illustrates a DC power supply 34 which obtains AC voltage coupled from line $L_3$ at node 41 through line 42, capacitor 43, resistor 44 and node 49 to node 50 which is tied to terminal $V_S$ of the control section CPU 35. Capacitor 43 serves as a high pass filter along with resistor 44. Also coupled to node 49 is resistor 48 connected to control section ground which, in conjunction with resistor 44, provides a voltage divider for stepping down the amplitude of the incoming AC voltage on line $L_3$ to nodes 49 and 50. Terminal $V_S$ is provided to sense the zero-crossing of the AC voltage applied to the motor. Also coupled to node 50 is a two-pole, single-throw switch $S_1$ identified by wiper terminal 51 and terminals 52 and 53. Terminal 53 is coupled to the AC input of power supply 34. Power supply 34 includes a rectifier circuit for converting the incoming AC voltage to an unregulated DC voltage. The unregulated DC voltage is applied to a voltage regulator circuit within power supply 34 and provides +5 volts DC at output terminal 37 which is connected to line 38 to distribute the +5 volts to the various $V_{CC}$ terminals of the operating portions of the control circuitry. Power supply 34 is connected from its common terminal 39 along line 40 to node 33 coupled to the control circuit ground. Line 40 is further coupled to various other portions of the control circuitry to provide the ground connection to the $V_{SS}$ terminals of the control sections as well as to individual portions of the circuitry related to the control section.

Switch $S_1$, described previously, couples the stepped down AC voltage to either terminal 53 to the power supply 34 or to a terminal 52 which provides a keep-alive bias current to the isolating circuits for the trigger control signal. This keep-alive current is necessary to maintain the gate control circuitry affecting the SCRs in an active condition. When power is supplied to the circuit, the gate drive current required for turning on each of the SCRs in their respective alternations of the incoming AC voltage is provided to enable them to turn on when the anode becomes positive with respect to the cathode. Thus terminal 52 of switch $S_1$ is coupled through resistor 55 to node 56 and thence along line 57 to the trigger terminal T of the phase control section 13. Similarly, terminal 52 of switch $S_1$ is coupled through resistor 58 to node 59 and thence along line 60 to terminal T of the phase control section 20. And, terminal 52 of switch $S_1$ is coupled through resistor 61 to node 62 and thence along line 63 to terminal T of phase control section 27. CPU 35 further includes one triggering terminal for each of the phase control sections described previously. The Trig1 trigger control signal from the CPU is provided to node 56. The Trig2 terminal of CPU 35, which is the trigger control signal for the phase control section 20, is applied to node 59. Similarly the Trig3 trigger control signal is supplied from the Trig3 terminal of CPU 35 to node 62.

FIG. 1 also illustrates in CPU 35 three input terminals corresponding to each of the three current sense zero-crossing signals. These signal terminal inputs are identified respectively as interrupt #1 (Int1), interrupt #2 (Int2) and interrupt #3 (Int3). Signals representing the zero-crossing event of the respective AC currents in each of the phase windings are obtained from the respective phase control sections. Beginning with phase control section 13, an output terminal at $I_1$ provides for sensing the zero-crossing of the motor winding current and applying that signal to terminal $I_1$ of comparator 36. Comparator 36 represents a composite of the individual comparator sections for each of the phase windings. Each comparator section includes a separate input filter and separate comparator section for its respective current sense line. Each of the comparators is referenced to a common voltage reference circuit. The comparator and filter circuits will be described hereinbelow in conjunction with FIG. 2. To summarize the operation, a current sense signal line is coupled from terminal $I_1$ of phase control section 13 to terminal $I_1$ of comparator 36, a current sense line is coupled from terminal $I_2$ of phase control section 20 to terminal $I_2$ of comparator 36 and a current sense line is coupled from terminal $I_3$ of phase control section 27 to terminal 13 of comparator 36. Correspondingly, the signal paths following the processing performed by the comparator section 36 are coupled along similarly identified lines to the CPU 35. Thus, Terminal $I_1$ of comparator 36 couples the current sense signal for phase control section 13 along line 75 to Int1 of CPU 35. Similarly, current sense line $I_2$ from comparator 36 is applied respectively along line 76 to Int2 of CPU 35 and from terminal 13 of comparator 36 along line 77 to Int3 of CPU 35. Composite comparator 36 receives DC voltage from power supply 34 along line 38 and also is tied to the control circuit ground at node 33.

There are several other features providing additional functions of the power factor controller shown in FIG. 1. CPU 35 includes an internal oscillator controlled by a crystal 68 coupled to terminals X1 and X2 of CPU 35. This crystal controlled oscillator serves as a continuous time base for operating the CPU 35 and provides a reference for making accurate time interval measurements. Terminal B7 of CPU 35 is coupled to the control circuit ground through a resistor 69 and a light emitting diode (LED) 70 to provide an indication of the operating status of the power factor controller according to the present disclosure. The LED 70 has three states: steady OFF indicates CPU 35 is off; steady ON indicates CPU 35 has been reset and is executing a start-up delay; and a flashing LED 70 indicates the circuit 13 is filly functioning to control the energy applied to the motor.

Several address lines of CPU 35 are also shown in FIG. 1. Terminal RA0 is shown connected through resistor 71 and a jumper block 72 which in turn is coupled to control circuit ground at line 40. The jumper block 72 provides for connecting the resistor 71 to ground to change the turn-on delay for the CPU 35 from approximately 30 seconds to approximately 45 to 60 seconds in this illustrative example. Address line RA2 is coupled through node 64 and resistor 65 to DC voltage line 38. Node 64 is coupled through variable resistor 81 to the control circuit ground at line 40. Address line RA3 is coupled through node 66 and resistor 67 to DC voltage line 38. Node 66 is coupled through variable resistor 82 to the control circuit ground at line 40. These variable resistors allow for adjusting the duration of the trigger control signal, i.e., the clip region, as described hereinbelow during the description of FIG. 6.

In operation, each of the phase control sections 13, 20 and 27 of FIG. 1 provides for controlling the flow of AC current along a respective AC voltage line through the SCR switches contained in the phase control section. For example, the AC voltage applied to terminal $L_1$ along line 1$_1$ and to terminal $L_1$ of phase control section 13 is coupled through the internal SCRs when they are in a conducting condition and therealong from the terminal $M_1$ along line 12 to one terminal $M_1$ of the three phase induction motor. As will be described hereinbelow, the control of the SCRs within the phase control section enables adjustment of the voltage applied to the motor in accordance with the power factor for that particular phase winding of the motor that is developed by the action of the CPU 35 in the control section. The control section develops a trigger control signal for controlling the respective gate drive circuit for each of the SCR pairs within each phase control section as a function of the time interval that occurs between the moment of the zero-crossing of the AC voltage applied to the motor and the AC current flowing in the motor winding for that particular phase of the applied voltage. The zero-crossing of the AC voltage is sensed at a respective terminal $V_S$ of CPU 35 as described previously. In the illustrative embodiment described herein it is usually not necessary to provide the same filtering and comparator circuits for the voltage sense zero-crossing signal because it is derived from an incoming phase of the AC voltage and is less likely to include a large noise component or be subject to phase shift variations as is the current sense zero-crossing signal. It is possible in certain applications, however, that some signal processing 20 circuit to ensure a clean, noise-free voltage sense signal may be required.

The zero-crossing of the AC current for the phase control section 13 is sensed along the line 75 coupled to Int1 terminal of CPU 35 after being processed by the comparator 36 to provide a clean, accurately timed and full logic level sense signal. Each of the respective phase control sections is controlled by its own trigger control signal developed from measuring its own power factor by determining the time elapsed between the respective zero-crossing events for each of the motor winding phases. The effect of a trigger control signal upon the SCRs is to disable the gate drive circuit for a period of time related to the particular power factor of the load measured during the alternation of the AC voltage previous to the phase of the voltage being controlled. This will be described in detail hereinbelow in conjunction with FIGS. 4A, 4B and 4C.

FIG. 2 is a simplified schematic of a power factor controller for one phase of the applied AC voltage according to the present invention. The basic internal structure of a phase control section is illustrated along with the control circuit or trigger generator which is responsive to and supplies control signals for the phase control section. Coupled between a first node 101 and a second node 102 are a first SCR 113 and a second SCR 114. The anode of an SCR 113 is connected to the first node 101 and the cathode of SCR 113 is connected to the second node 102. Similarly, the anode of an SCR 114 is connected to second node 102 and the cathode of SCR 114 is connected to first node 101. The gate terminal of SCR 113 is connected to a node 105 and the gate terminal of SCR 114 is connected to a node 106. Also connected between first node 101 and second node 102 is the series combination of a resistor 115 and a capacitor 116. First node 101 is connected to a node 103 and the second node 102 is connected to a node 104. A gate drive circuit comprising the parallel combination of a resistor 117 and a steering diode 119 is connected between node 103 and node 105. Similarly, a gate drive circuit comprising the parallel combination of a resistor 118 and a steering diode 120 is connected between node 104 and node 106. The cathode of steering diode 119 is connected to node 105 and in turn to the gate terminal of SCR 113. Similarly, the cathode of steering diode 120 is connected to node 106 and in turn to the gate terminal of SCR 114. Node 105 is connected along a line 111 through a resistor 139 to one terminal of an optocoupler 136 at one side of an optically sensitive triac 138 within optocoupler 136. Similarly, node 106 is connected along a path 112 to the opposite side of optically sensitive triac 138 within optocoupler 136. Optocoupler 136 is located within a trigger generator 130 to be described hereinbelow. The applied AC voltage is applied to terminal $L_1$ which is coupled to node 161 and coupled therefrom along a line 107 to node 103. Node 103 is further coupled along a line 109 to node 141 within trigger generator 130. Node 161 is further coupled to earth ground through a harmonic suppression capacitor 121. The AC voltage terminal for supplying AC current to the motor winding controlled by the phase control section shown in FIG. 2 is supplied from node 104 along line 108 through a node 162 to terminal $M_1$ of the motor winding coupled to the phase controller shown in FIG. 2. Node 162 is coupled through a harmonic suppression capacitor 122 to earth ground.

In operation, the representative phase control section illustrated in FIG. 2 provides for controlling the switching of applied AC voltage to the respective motor winding connected to the phase control section. SCR 113 and SCR 114 are each connected in series with the applied AC voltage such that the applied voltage supplies the necessary anode-to-cathode voltage for the respective SCR to be triggered into conduction at the onset of either alternation of the applied AC voltage. Then an appropriate current is supplied to the respective gate which is enabled to conduct by the polarity of the AC voltage that appears between first node 101 and second node 102. Thus, SCR 113 is enabled to conduct when the first node 101 is at a positive potential with respect to second node 102 and gate drive current arrives via the gate drive circuit coupled between nodes 103 and 104. Similarly SCR 114 is enabled to conduct in the presence of a suitable gate drive current when the polarity of the applied voltage of first node 101 is negative with respect to second node 102. The respective gate drive current for SCR 113 is supplied through the first gate drive circuit (comprising resistor RI 7 and steering diode 119) during the time when the first node 101 is positive with respect to second node 102. Similarly, the gate drive necessary for causing SCR 114 to go into conduction is supplied through second gate drive circuit (comprising resistor 118 and steering diode 120) via node 106 to the gate of SCR 114 and second node 102 and node 104 have a positive potential with respect to first node 101 and node 103. As will be described in detail hereinbelow, the optically sensitive triac 138 within optocoupler 136 is always in a conducting state except when caused to turn off by the trigger control signal from CPU 35 and impressed across LED 137 within optocoupler 136. The effect of the triac 138 and the series resistor 139 is to maintain both nodes 105 and 106 and, therefore, the first and second gated drive terminals $G_1$ and $G_2$ at a common, balanced potential with respect to first node 101 and second node 102. This assures that each gate terminal will be biased to be driven into conduction when the respective SCR is forward biased by the applied AC voltage. When triac 138 is conducting, resistor 139 and the conducting triac provide a path for the gate voltage of each respective SCR to be biased with respect to the polarity of the applied voltage opposite that of the respective SCRs anode terminal. Without the conductive paths through resistor 139 and a conducting triac 138, this reference path is absent and the respective gate is allowed to float; therefore it cannot then obtain a potential that is positive with respect to the cathode voltage of the respective SCR. Thus, when the triac 138 is caused to go into a non-conducting state, the balancing path through resistor 139 is opened. This action allows the gates to float and inhibits the gate drive to the respective SCR, thus interrupting the application of the applied AC current to the motor winding. The series combination of resistor 115 and capacitor 116 connected between first node 101 and second node 102 provides a snubbing action to limit the turn off transients of each SCR as it enters a non-conducting state.

The circuitry within the trigger generator 130 is best described with reference to FIG. 2. An optocoupler 133 is shown which contains a bidirectional light emitting diode pair 134 on its input side and a photo transistor 135 on its output side. The emitter of the photo transistor 135 is coupled to the control circuit ground. The collector of photo transistor 135 within optocoupler 133 is coupled to a node 142. A resistor 143 is coupled from the node 142 to the DC supply voltage through a node 151 to the supply voltage line 38 (not shown in FIG. 2). A resistor 144 is coupled between node 142 and control circuit ground. Node 142 is further coupled to a node 146 through a resistor 145, and node 146 is coupled to the positive input of a comparator 148. Node 146 is coupled to control circuit ground through a capacitor 147, thus forming a low pass filter for filtering any noise present on the signal appearing at node 142. The negative input terminal of comparator 148 is coupled to a voltage reference source at a terminal 149. In the illustrative embodiment shown herein, the reference voltage provided at terminal 149 may be on the order of +2.5 volts DC. The output of comparator 148 is coupled to a node 150 which in turn is coupled to the current sensing input of the CPU 132 in the trigger generator 130. CPU 132 in FIG. 2 is functionally the same as CPU 35 in FIG. 1 in the illustrative embodiment. Node 150 is also coupled through a resistor 152 as a pull-up resistor connected through a node 151 to the supply voltage at line 38.

As shown in the optocoupler 133 in FIG. 2, bidirectional light emitting diode 134 is coupled on one side to line 110 to node 104 in the phase control circuit. The opposite side of bidirectional light emitting diode 134 is coupled through resistor 140 to node 141 which is connected to the source of AC voltage applied to the circuit. In operation, when the voltage applied to both sides of the bidirectional light emitting diode 134 is at the same potential, neither of the bidirectional LEDs will be able to conduct and therefore they are both off and no light is being emitted that can be picked up by the photo transistor 135. This condition arises whenever there is no current flowing between the $L_1$ terminal and the $M_1$ terminal because both SCRs are in a non-conducting state, which condition arises when the current between first node 101 and second node 102 is in a zero-crossing condition. At this instant the bidirectional LEDs 134 turn off and remove the drive signal from the base of phototransistor 135 causing its collector to rise to the applied DC voltage. As this voltage rises past the level of the voltage reference value present at terminal 149, the comparator 148 changes state and provides a full swing logic signal to the current sense input of the CPU 132.

Figure 3A:
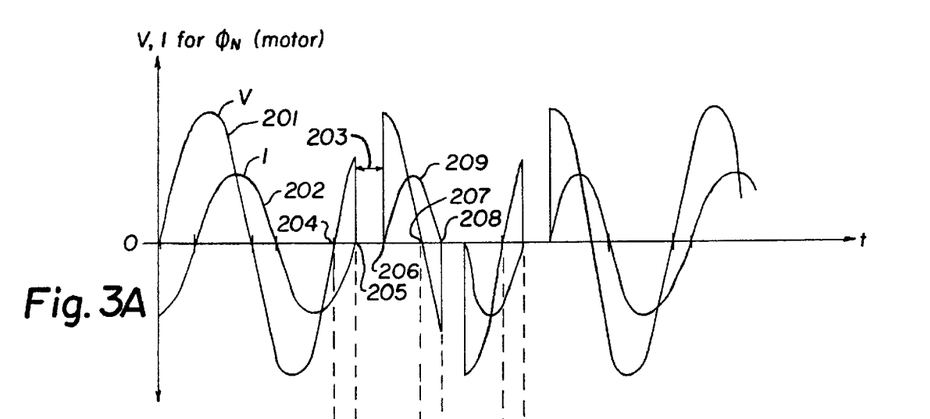
FIG. 3A illustrates the voltage and current waveforms of a representative phase of the electrical power connected to the motor winding.
Figure 4A:
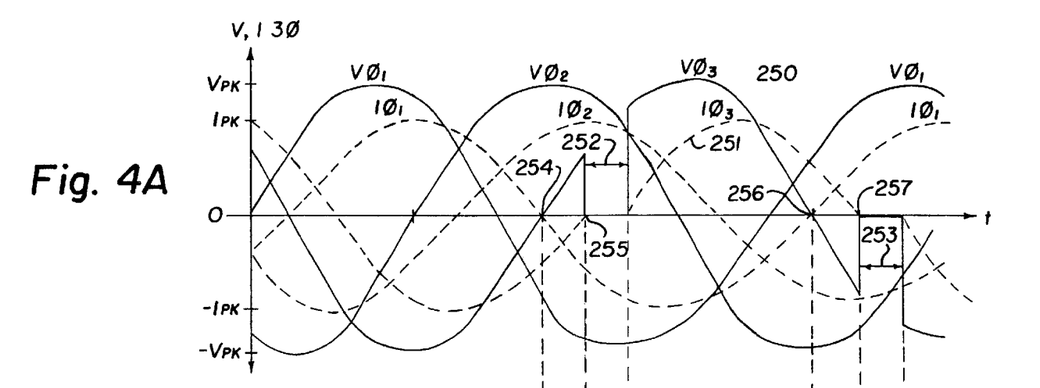
FIG. 4A illustrates each phase of the voltage and current waveforms coupled to a three-phase motor wherein one of the phases of the voltage and current waveforms are shown with the clipped region of the waveforms providing the reduced power delivered to the motor.

The light emitting diode 137 within optocoupler 136 receives its operating current from the DC voltage supply through a resistor 154 and a node 153 to the anode of LED 137. The 10 cathode of LED 137 is connected to control circuit ground. Node 153 is further coupled to the trigger output of CPU 132. In operation, a trigger control signal supplied by CPU 132 causes node 153 to fall to logic low which turns off LED 137 causing the output circuit comprising triac 138 and resistor 139 to become an open circuit. Also shown in trigger generator 130 is a voltage sense circuit wherein the voltage sense terminal of the CPU 132 is coupled through node 155 and resistor 160 to a terminal 157 of a wiper of a single-pole double-throw switch. The other side of the wiper is shown connected to a terminal 158 which is also coupled to node 141 and in turn coupled to the applied AC voltage at terminal $L_1$. Terminal 158 of the switch is shown labeled as single phase and a terminal 159 is shown labeled as three phase with an arrow indicating that it is to be used when the switch is set for three phase operation. In the three phase operation condition, the voltage sense line is connected to line L3 to obtain an AC voltage zero-crossing signal. In either case the AC voltage zero-crossing signal is coupled from terminal 157 through a resistor 160 and a node 155 to the voltage sense terminal of CPU 132. Node 155 is coupled to ground through a resistor 156. Resistor 156 and a resistor 160 form a voltage divider to step down the relatively high value of the applied AC voltage to a level that can be tolerated by the input port of CPU 132. Due to the step down divider action of resistors 156 and 160, and the fact that the line voltage applied to the Vs terminal is very small—typically less than +5 volts peak-to-peak—as well as being AC coupled (via $C_3$) no other isolation is required in the Vs sense line. In operation, the CPU 132 calculates the time difference between the arrival of a zero-crossing signal at the voltage sense terminal and the zero-crossing signal arriving at the current sense terminal to determine a measure of the power factor of the load coupled to the motor. CPU 132 uses this time measurement to calculate the duration of the trigger control signal that is supplied at the trigger terminal of CPU 132. The relationship of the zero-crossing signals supplied to the voltage and current sense terminals and the development of the trigger control signal will be described hereinbelow with respect to FIGS. 3 and 4.

FIG. 3A illustrates the voltage and current waveforms of a representative phase of the electrical power connected to the motor winding. The current waveform 202 is shown lagging the voltage waveform 201, as is typical in the winding of an induction motor. One cycle of the voltage waveform 201 and of the corresponding current waveform 202 beginning with the zero-crossings occurring at times 204 (voltage) and 205 (current) respectively is shown in FIG. 3A. These waveforms show the effect of the control circuit described previously in conjunction with FIG. 2 with respect to the reduction of the applied voltage to the motor. The voltage to the motor is, in effect, turned off for a brief portion of each positive and negative alternation of the applied AC voltage. The amount of time the applied AC voltage is turned off during each alternation is proportional to the power factor that is calculated from the time interval that occurs between two successive interrupts corresponding to the zero-crossing of the respective applied voltage and applied current through the motor winding. Thus, in FIG. 3A the OFF portion of the applied voltage appears as interval 203 corresponding to the pulse width of the trigger control signal (to be described) which is generated based on the elapsed time between the voltage zero-crossing at time 204 and the current zero-crossing at time 205. The trigger control signal ends at time 206. At the end of the trigger control signal the voltage rises to its nominal peak value and returns to its sinusoidal waveform. The same effect is seen in the negative alternation wherein following the voltage zero-crossing interrupt at a time 207 and the current zero-crossing interrupt at time 208 the trigger control signal is once again applied to the SCR gate drive circuit and causes the voltage waveform 201 to be turned off for a portion of a time before being restored to the sinusoidal waveform shown in FIG. 3A In this way, by turning off the applied voltage for brief controlled periods during each alternation of each cycle, the average voltage applied to the motor winding is reduced to compensate for the large power factor that develops when the motor is lightly loaded. This reduction in the average power delivered to the load tends to bring the power factor back into an efficient range.

During each alternation of the applied voltage, the lagging current corresponding to the applied voltage is also reduced to zero during the OFF interval of the applied voltage beginning, as with the voltage, at the time that the current passes through zero. It will also be noted in FIG. 3A, that when the current begins to flow in the motor winding after the end of the OFF period, the current does not instantaneously rise to the value that it would have been without the applied AC voltage being switched off by the trigger generator; rather it rises in approximately sinusoidal fashion and once again crosses zero at a time 208 corresponding to the amount by which the current waveform lags the voltage waveform. The reason for this is that the current in an inductance is not able to change instantaneously but rather requires some amount of time to charge the inductance of the winding. The same effect, of course, is repeated in each successive alternation of the current in the windings corresponding to the applied AC voltage.

Figure 3B:
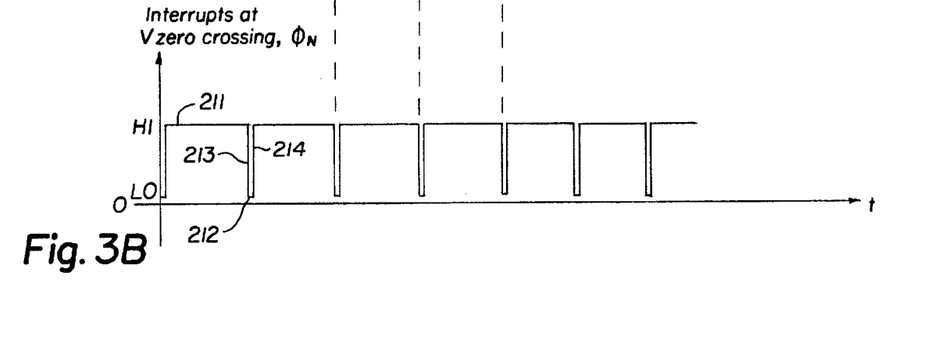
FIG. 3B illustrates interrupt waveforms corresponding to the voltage sense zero-crossing signals in the representative phase of the applied voltage.

FIG. 3B illustrates a series of interrupt pulses corresponding to the voltage sense zero-crossing signals in the representative phase of the applied voltage. In FIG. 3B a very brief negative transition occurs at every point in time that the applied AC voltage waveform passes through zero. This negative transition is shown in the form of a brief negative going pulse which returns to the high logic level almost immediately following the zero-crossing event. Thus, the waveform 211 includes for each zero-crossing event a negative transition 213 to a logic low level and returns via a positive transition 214 to the high logic level of waveform 21 1 until the next zero-crossing event of the applied AC voltage. Thus is developed a negative pulse train which has a repetition rate of 120 cycles per second for 60 cycle AC power or in the case of 50 cycle AC power, the repetition rate would be 100 Hz. These interrupts are developed within the CPU 35 in response to the voltage $V_s$ that appears at the voltage sense terminal of CPU 35.

Figure 3C:
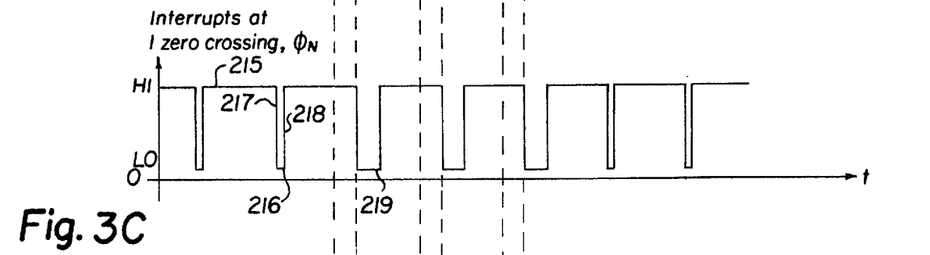
FIG. 3C illustrates interrupt waveforms corresponding to the current sense zero crossing signals in a representative phase of the applied voltage.

FIG. 3C illustrates a series of interrupt pulses corresponding to the current sense zero-crossing signals in a representative phase of the applied voltage. The wave shapes in FIG. 3C appear very much as the interrupt wave shapes of FIG. 3B with the exception that the trailing edge of the pulse corresponding to a trigger event is delayed during the period that the current is zero because both SCRs are off until the end of the gate control and the applied voltage is once again applied to the motor. Thus the interrupt signal corresponding to the current zero-crossings normally has a logic high level until a zero-crossing event occurs whereupon the signal undergoes a very rapid negative transition to a low logic level and, unless there is a trigger control signal present will almost immediately return along a very rapid positive transition to the nominal high level logic signal. It however, a trigger control signal is applied, then the zero-crossing signal that is sensed at the motor winding terminal remains at a low logic level until the end of the trigger control signal. In FIG. 3C, there is shown a succession of three trigger control periods, one for each of three successive alternations of the applied AC voltage corresponding to the waveform illustrated in FIG. 3A. In FIG. 3C, a high logic level 215 becomes a negative transition 217 at the instant of a zero-crossing event of the current in the motor winding and falls to a low logic level 216 until it is restored along a positive transition 218 to the nominal high level 215. The low logic level corresponding to the period that a trigger control signal is active is shown as low logic level 219 in FIG. 3C.

Figure 3D:
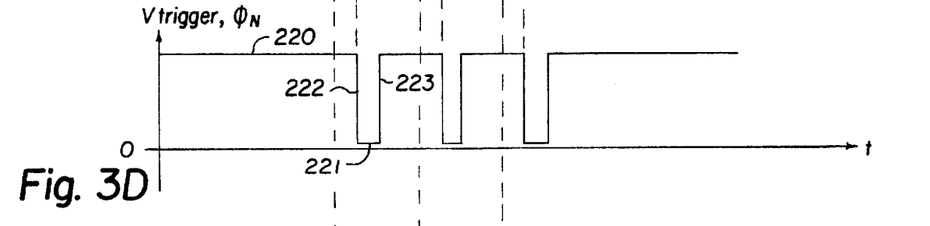
FIG. 3D illustrates a waveform of the trigger control signal derived from the zero-crossing signals applied to an SCR gate drive circuit.

FIG. 3D illustrates the trigger control signal which, during the period that it is active, closely resembles the interrupt waveform corresponding to the zero-crossing events of the applied voltage and current during the period the trigger control signal is active. Again, a high logic level 220 is followed by a negative transition 222 to a low logic level 221 where the signal remains until the end of the trigger control signal is followed by a rising transition 223 to the nominal high logic level 220. It will be observed by comparing FIG. 3B and FIG. 3C that the negative transition of the sense signals provide the interrupts and the information needed to approximate the power factor of the motor. The elapsed time between the zero-crossing events is obtained by subtracting the earlier time of a voltage zero-crossing event from the later time of the current zero-crossing event and using this interval of time to calculate the duration of the trigger control signal that is needed to reduce the average applied AC voltage to the amount necessary to bring the power factor for a light load back within a reasonable and efficient range. As previously described, the trigger control waveform shown in FIG. 3D controls the opening of the SCR gate circuit comprised of R139 and the triac 138 within optocoupler 136 shown in FIG. 2. When the SCR gate circuit is opened, the SCR enters a non-conducting or blocking state.

Figure 4B:
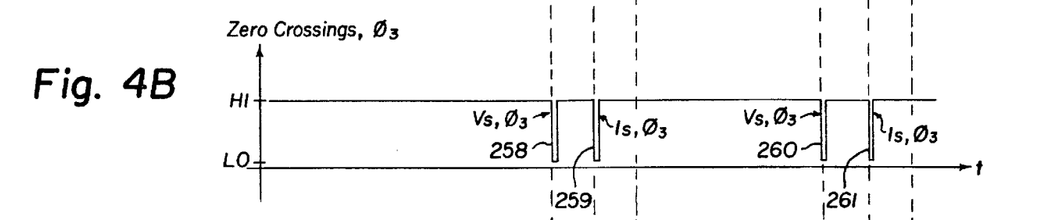
FIG. 4B illustrates waveforms corresponding to the current sense zero-crossing signals of the particular phase of the voltage and current illustrated in FIG. 4A.

FIG. 4A illustrates both a voltage waveform 250 and a current waveform 251 for a three phase system wherein one cycle of the phase three voltage waveform 250 shows the effect of the power factor controller upon the voltage and current waveforms for that particular cycle. The zero-crossing events for the applied voltage occur at times 254 and 256 in FIG. 4A; similarly the times for the occurrence of the zero-crossing events of the current waveform occur respectively at times 255 and 257. The difference in time occurring between the respective voltage and current zero-crossing interrupts is used to calculate the duration of the control period for each alternation of the applied voltage waveform. This control period, sometimes also called a clip region 252, in the positive and clip region 253 in the negative of the phase three voltage waveform 250, represents the time during which the AC voltage is interrupted or removed from the motor windings to which that phase three is connected. Once again it is seen in FIG. 4A that the resulting current waveform 251 in phase three takes on a sinusoidal characteristic between the end of the trigger control or clip region 252 and the subsequent zero-crossing event at a time 257 that follows the applied AC voltage zero-crossing according to the particular amount of phase lag between the current and voltage for that winding of the motor. FIG. 4B in this illustrative example shows the zero-crossing sense signals for both the voltage and current in the particular phase three illustrated in FIG. 4A. A voltage sense signal 258 for phase three is followed in time by a current sense signal 259 for phase three. Similarly, in the succeeding alternation in the negative direction a voltage sense signal 260 for phase three is shown followed by a current sense signal 261 for phase three.

Figure 4C:
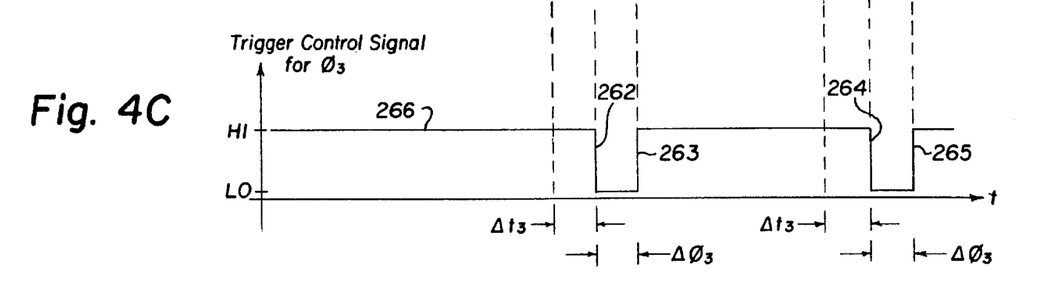
FIG. 4C illustrates a trigger control signal resulting from detection of the zero-crossing events illustrated in FIG. 4B which is applied to the gate drive circuit of the first and second SCRs.

FIG. 4C shows the trigger control signal for phase three corresponding to the zero-crossing sense signals illustrated in FIG. 4B. It can be readily seen that the timing of the trigger control signal begins at the onset of the current zero-crossing signal and continues for the clip region 252 until the trigger control signal once again returns to the high logic level at a transition 263 for the positive going alternation of phase three of the applied voltage waveform 250 shown in FIG. 4A. Similarly the trigger control signal for the negative alternation of phase three is shown also in FIG. 4C with a negative transition 264 followed after the clip region interval at a transition 265 back to the logic high nominal level. A simple relationship may be pointed out as shown in FIG. 4C wherein the time between the voltage and current zero-crossing events—and the corresponding interrupts—is identified as $\Delta T_3$ and the duration of the clip region which follows the current zero-crossing interrupt is identified as $\Delta\Phi_3$. $\Delta T_3$ corresponds to the power factor of the load on the motor winding and $\Delta\Phi_3$ corresponds to the duration of the clip region, i.e., the control period of the same alternation for which the power factor measurement has been made. These two variables will be seen to be related by a simple factor depending upon the kind of motor being controlled.

Figure 5:
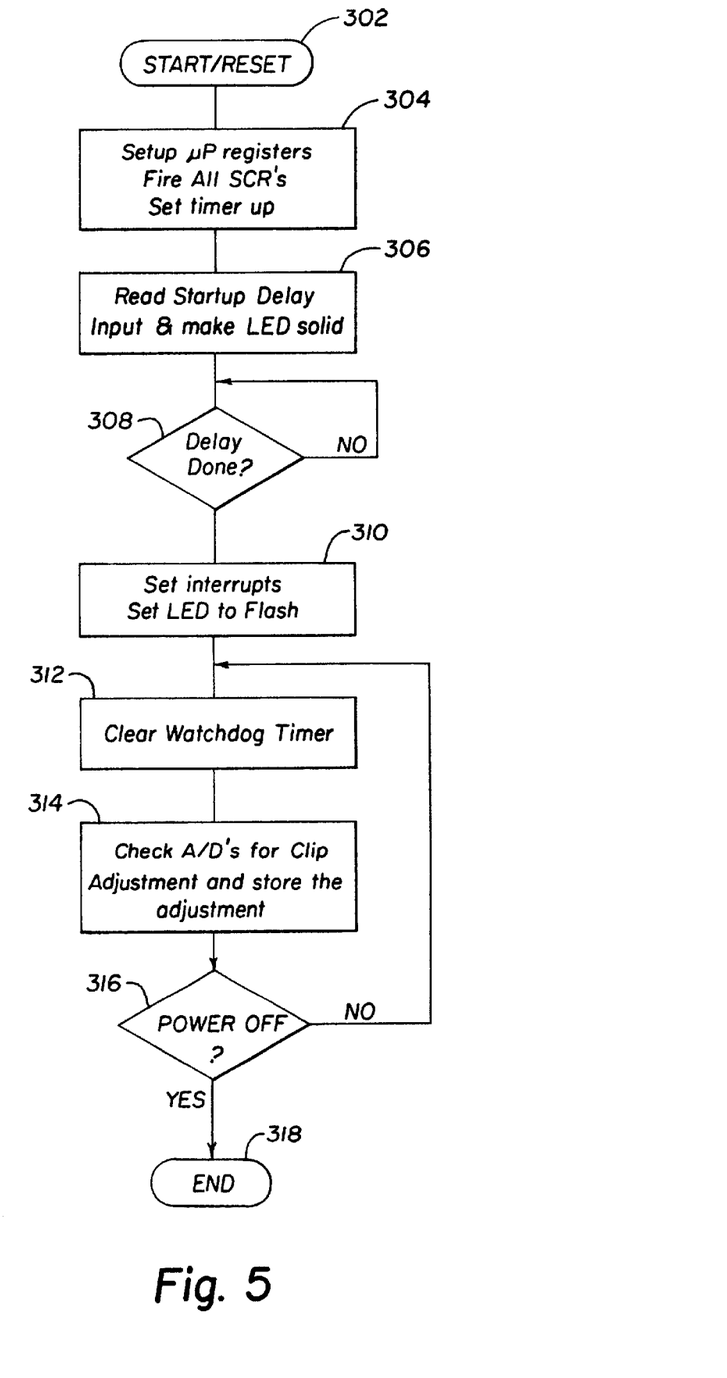
FIG. 5 is a flowchart of the main routine of the program for operating the CPU of the trigger generator in accordance with the invention.

FIG. 5 illustrates a simplified flowchart illustrating the main program routine for the power factor controller of the present disclosure. The flow begins at a block 302 where the program starts when power is applied to the system or when the system has been reset. The flow proceeds to a block 304 where the CPU runs through the routine for setting up all of the registers in the CPU, for firing all of the SCRs of the phase control sections so that power may applied to the motor, and for setting the preset timer values. Thereupon the flow proceeds to a block 306 where the routine reads the startup delay input to the system and causes the status LED to become illuminated continuously. The startup delay referred to in block 306, as described hereinabove, is the delay set by the jumper 72 which connects resistor 71 to the control circuit ground. This delay, with the jumper removed, is on the order of 30 seconds; with the jumper in place the delay is lengthened to the range of 45 to 60 seconds. In a block 308, the routine checks to be sure the delay has been fully executed and proceeds to a block 310 where the routine sets the interrupts and sets the status LED to a flashing condition indicating that the CPU is controlling the operation of the power factor controller.

Following block 310, the main program routine proceeds to a block 312 and the principle operations of the CPU are performed in a loop that begins with clearing the watchdog timer in a block 312 followed by a flow of the routine to a block 314 to check the analog to digital converters for clip adjustments that have been calculated and if clip adjustments are found then the CPU stores the clip adjustments for later use during the appropriate interrupts to be discussed hereinbelow. Clip adjustments are changes to be made to the duration of the trigger control signal. Following execution of the principle program steps, the main program routine proceeds from a block 314 to a decision block 316 wherein it checks for whether or not the power has been turned off to the system; if the result is affirmative then the flow proceeds to a block 318 where the routine ends and the system is off. If, however, the power is still on, then the flow returns to the step illustrated in a block 312 to clear the watchdog timer and the main program routine proceeds through its principle functional activities. As was previously stated, an interrupt may occur at any time during the operation of the main program routine. The CPU for the power factor controller of the present disclosure has been programmed to service these interrupts as they occur during the principle program loop represented by blocks 312 and 314. The interrupts that are serviced by the main program routine are described in the flowchart illustrated in FIG. 6 to be described hereinbelow.

Figure 6A:
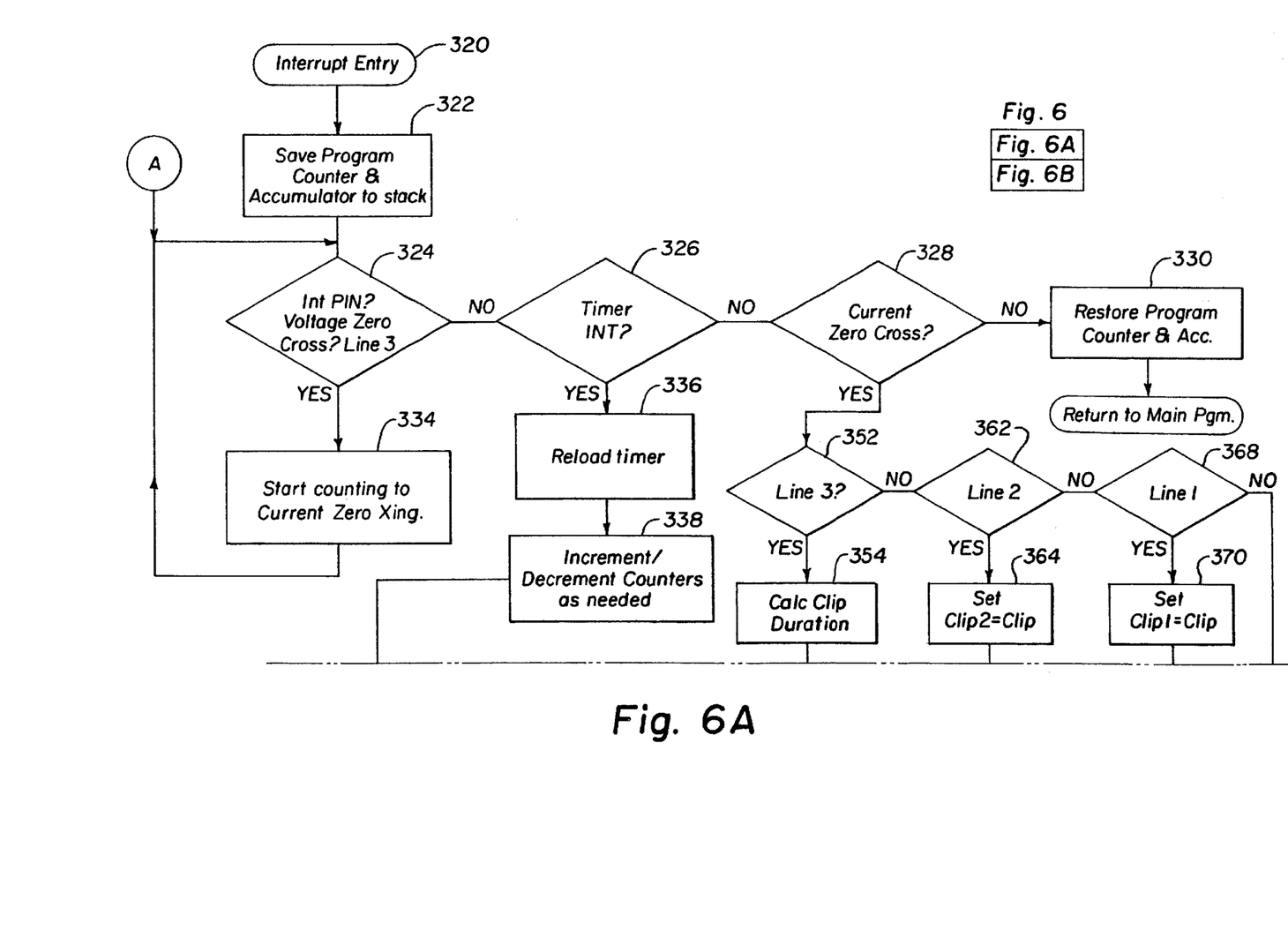
FIG. 6 is a flowchart for the interrupt routine in which the zero-crossing information is utilized to generate a trigger control signal to control the power delivered to the motor by the power factor controller.
Figure 6B:
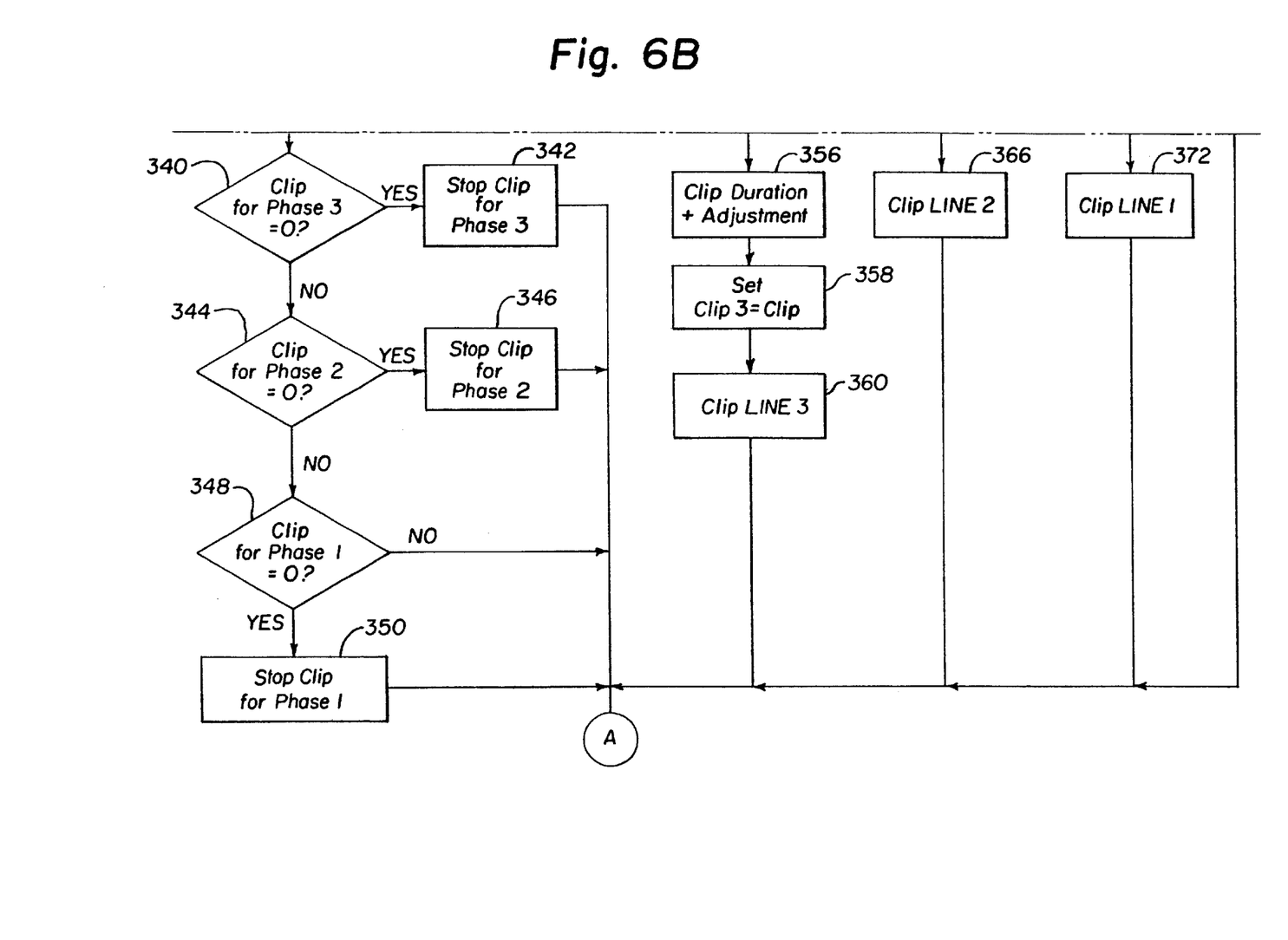

FIG. 6 illustrates the routine for processing the interrupts that may occur in the power factor controller of the present disclosure. The routine is entered at a block 320 when an interrupt occurs, followed by a block 322 wherein the routine saves the program counter and the accumulator to the stack for use when the interrupt(s) have been serviced and the flow returns to the main program. The interrupt routine of FIG. 6 provides for servicing three kinds of interrupts essential to the operation of the power factor controller. These three kinds of interrupts are represented by decision blocks 324, 326 and 328. Decision block 324 represents the occurrence of an interrupt for a signal representing a voltage zero-crossing event which, in the illustrative embodiment, occurs when the AC voltage of line 3 crosses through the zero point as sensed by an interrupt pin. If the interrupt was not of this type then the flow proceeds to decision block 326 where the routine determines whether the interrupt that is present is a timer interrupt that is, a timer which operates at 128 times the power line frequency in the illustrative example. This timer provides for dividing the power line frequency period into 128 equal slices to provide a time base for the operation of the power factor controller to determine the timing associated with measuring the zero-crossing interval, ΔT, and calculating the duration ΔΦ of the trigger control signal (e.g., 266 in FIG. 4C) generated by the CPU 132 in the trigger generator 130 as shown in FIG. 2. If the interrupt being serviced in block 326 is not a timer interrupt, then the flow proceeds to a block 328 where the routine determines whether the interrupt corresponds to the occurrence of a zero-crossing event of the current in the motor. If the result of this determination is negative, then the flow proceeds to a block 330 where the interrupt routine restores control to the program counter and the accumulator and, in a block 332, returns to the main program.

Returning now to decision block 324, if the interrupt that is present represents the zero-crossing of the AC voltage at line 3, then the flow proceeds along the path labeled "yes" to a block 334 where the internal counter begins counting from zero toward the time when an interrupt representing the zero-crossing of the current occurs in order to measure the interval ΔT between the voltage zero-crossing event and the current zero-crossing event for line 3 of the applied AC voltage. When the current zero-crossing event occurs, the flow proceeds back to the entry of decision block 324 which is also identified as point A in the interrupt routine and a decision is made in decision block 324 as to whether the interrupt that just occurred is a voltage zero-crossing event in line 3. In this particular case, the flow will proceed from decision block 324 to decision block 326 because the interrupt that just occurred was not a voltage zero-crossing event in line 3. In decision block 326 the routine checks for whether the interrupt that just occurred was caused by the internal timer and in this case the result is negative so the flow proceeds to a block 328 where a determination is made as to whether the interrupt that just occurred is a current zero-crossing event. In this case, the result is affirmative and the flow proceeds along the path labeled "yes" to a second level of decision blocks 352, 362 and 368. In decision block 352, the routine determines whether the interrupt representing a zero-crossing event of the current occurred in line 3. If the determination is affirmative, then the flow proceeds along the path labeled "yes" to a block 354 where the routine calculates the duration of the clip region which, as previously described, is the same as the duration of the trigger control signal (e.g., 266 in FIG. 4C) to be generated by CPU 132.

The duration ΔΦ of the trigger control signal(e.g., 266 in FIG. 4C) determines the duration of the clip region in a one-to-one relationship. The trigger control signal, by causing the disabling of the gate drive circuits for the SCRs in each phase control section causes the SCR in the respective alternation to enter a non-conductive state during the period of the clip region. Thus the clip region represents the period when the AC voltage to the motor winding is interrupted. The duration of this clipped region of the AC voltage is a function of the amount of phase lag of the current in the motor winding relative to the voltage zero-crossing event for the associated phase of the AC voltage applied to the motor winding. In the illustrative embodiment, the relationship of the trigger control signal duration in general is some predetermined multiple of the duration ΔT of the time elapsed between the voltage zero-crossing event and the current zero-crossing event for that particular phase. For example, in motors operating on 240 volts AC, three phase, the duration of the trigger pulse bears a one-to-one relationship with the duration of the zero-crossing interval ΔT. Thus, in this example, the length of time the voltage waveform will be interrupted is equal to the elapsed time occurring between the zero-crossing events for the particular phase being controlled by the trigger control signal. This one-to-one relationship may be modified by a clip adjustment which is added to the clip duration or the pulse width of the trigger control signal pulse ΔΦ to advance or retard the trailing edge of the trigger control signal. The clip adjustment will be described hereinbelow. Similarly, in another example for three phase motors operating on 480 volts AC, the duration of the clip region is determined by dividing the zero-crossing interval AT by two and adding a clip adjustment to advance or retard the trailing edge of the trigger control signal for that particular type of motor.

The clip adjustment made to the duration of the clip region, i.e., the pulse width of the trigger control signal ΔΦ is determined from the setting of potentiometers in the trigger generator connected to designated pins of CPU 35 shown in FIG. 1. The designated pins of CPU 35 for these potentiometer connections are RA2 and RA3. The potentiometers form the lower half of a voltage divider connected between the +5 volt $V_{CC}$ line 38 and the control circuit ground at line 40. RA2 at CPU 35 is connected to node 64 which is the junction between resistor 65 and potentiometer 81. Potentiometer 81 provides for setting the clip adjustment for 240 VAC motors in this illustrative example. Similarly in RA3 of CPU 35 is connected to node 66 which forms the junction of resistor 67 and potentiometer 82. Potentiometer 82 provides for setting the clip adjustment for 480 VAC motors. When potentiometer 82 is set to its maximum resistance, no additional time is added to the duration of the zero-crossing interval ΔT to set the pulse width of the trigger control signal (266). As the resistance of potentiometer 82 is reduced, the voltage at pin RA3 at CPU 35 is also reduced which has the effect of advancing the occurrence of the trailing edge of the trigger control signal that is, to shorten the pulse width of the trigger control signal. When potentiometer 81 is set to its minimum resistance, the voltage at pin RA2 is set to its minimum value. As the resistance of potentiometer 81 is increased, the effect is to retard the timing of the trailing edge of the trigger control signal; that is to lengthen the pulse width of the trigger control signal.

Continuing with the two examples for 240 volt AC three phase motors and 480 volt AC three phase motors described above, the predetermined settings for determining the clip adjustment to the pulse width for the respective trigger control signals for these two types of motors was described. It will be appreciated that these two examples are illustrative of just two of numerous possible arrangements in the control of the pulse width for controlling the power delivered to each phase of a three phase machine or even to a single phase machine may be determined. Thus, whether the adjustment is called a clip adjustment or by some other term, these examples are illustrative of the variety of ways in which the pulse width of the trigger control signal may be determined for any particular application.

As shown in FIG. 6 at a block 356, the routine sets the clip region duration and adjusts it according to the setting of the potentiometers 81 and 82 external to CPU 35 as shown in FIG. 1. The flow then proceeds to a block 358 where the routine sets the pulse width of the trigger control signal for phase three to the clip duration as adjusted in the block 356. The flow then proceeds to a block 360 which represents the application of the trigger control signal to the SCR gate drive circuit within the phase three control section (27 in FIG. 1) to cause the phase control section 27 to clip line 3, that is, to inhibit the gate drive circuitry within the phase control section 27 so as to cause the SCR corresponding to the particular alternation of the applied AC voltage to turn off following the zero-crossing event until the gate drive is restored by the trailing edge of the trigger control signal. From block 360, the flow then proceeds along the line to the point A which, as previously described, returns the routine to the input to decision block 324.

In the event that the current zero-crossing event did not occur with AC line 3 (see FIG. 6), then the flow proceeds along the path identified as "no" to decision block 362 where a determination is made whether the particular phase to which the current zero-crossing event is associated is phase two. If the result of the determination in block 362 is affirmative then the flow proceeds to a block 364 where the clip duration for phase two is set equal to the clip duration plus adjustment as determined in block 356. It is important to note that the clip duration adjustment that occurs in block 356 is utilized to determine the clip duration for each of the phases of the motor winding. Thus, once it is determined for phase three in block 356, then the same value is used for succeeding phases until the value is updated or recalculated in block 356 when the interrupt routine is servicing the time interval between the voltage zero-crossing and the current zero-crossing for phase three.

Returning now to block 364, after the clip duration for phase two is set equal to the clip duration calculated in block 356, then the flow proceeds to a block 366 whereupon the trigger generator outputs a trigger control signal for phase two and causes the inhibition of the gate drive circuitry for the corresponding SCR in the phase control section for phase two as previously explained for block 360. After generating the trigger control for phase two, then the flow proceeds again to point A where it returns to the input decision block 324. Returning now to decision block 362, if it was determined that the current zero-crossing event did not occur with phase line two, then the flow proceeds along the path identified as "no" to a decision block 368 which makes a determination as to whether the current zero-crossing event occurred in phase one. If the result is negative, the flow proceeds along a path identified as "no" to point A where it returns to the input of decision block 324. If, however, the result of the determination in block 368 is affirmative, then the flow proceeds to a block 370 where the routine sets the clip duration for phase one equal to the clip duration determined in block 356 and then proceeds to a block 372 where the trigger control signal for phase one is generated having the duration determined in block 370, causing the SCR corresponding to the particular alternation of the applied AC voltage to become non-conductive, thus blocking the application of the AC voltage to the respective motor winding for the duration of the pulse width of the trigger control signal. Thereupon, the flow proceeds to point A and back to the input of decision block 324 to again evaluate the next interrupt.

Returning again to decision block 326 which determines whether the interrupt received was caused by the internal timer and the case where the resulting determination was affirmative, the flow proceeds to block 336 whereupon the counter which counts the increments of time that make up the duration of the clip region, that is, the pulse width of the trigger control signal, is reloaded with the reload value corresponding to the clip duration plus any adjustment that was provided. After the timer is reloaded, the flow proceeds to block 338 where the routine increments or decrements the counters as needed toward the end of the clip region. While counting, the interrupt routine checks to determine which clip region is being counted and whether that particular count for that clip region has reached zero corresponding to the end of the clip region. Thus, beginning with decision block 340, the routine determines whether the counter for clip region three has reached zero and if the result is "yes" in block 342, the counting is halted marking the end of the clip region which is equivalent to the trailing edge of the trigger control signal pulse. The trigger generator then outputs a positive transition to end the clip region for that alternation. The flow then proceeds to point A where the routine returns back to the input to block 324. Returning now to block 340 where the decision to determine whether the counter for clip 3 region three has reached zero and the answer is negative then the flow proceeds to decision block 344 which seeks to determine whether the clip region being processed is for phase two and if so, whether the counter has reached zero. If the answer is affirmative, then the flow proceeds to block 346 where the clip region count is halted at zero and the trigger generator is signaled to end the clip region by outputting a positive transition trailing edge to the trigger control signal pulse for phase two. Again, the flow then proceeds to point A and back to the decision block 324.

Returning again to decision block 344, if the clip region being processed is not phase two or the count has not reached zero then the flow proceeds to decision block 348. In block 348 the determination is made as to whether the phase being processed is phase one and the counter for this phase has reached zero; if the result is "no," then the flow proceeds to point A and back to the input of block 324 to continue processing the interrupt routine. If however, the determination is made in decision block 348 that the present clip region is determined to be phase one and it has reached zero then the processing flows along the "Yes" path to block 350 where the counter for counting down the time value for clip region one is halted and the trigger generator outputs a positive going trailing edge and the clip region for phase one whereupon the flow continues back to point A and returns to the input of decision block 324 to continue processing subsequent interrupts.

Although the preferred embodiment has been described in detail, it should be understood that various changes, substitutions and alterations can be made therein without departing from the spirit and scope of the invention as defined by the appended claims.

What is claimed is:

1. A controller for dynamically matching energy use by an AC induction motor having at least one motor winding and an AC voltage applied thereacross to the load on said motor comprising:

first and second SCRs, each having a respective gate and connected in parallel with each other in opposing polarities between a first node and a second node, for each phase of said AC voltage wherein said first node is connected to a source of said AC voltage and said second node is connected to said at least one motor winding of the motor; and a trigger generator coupled to said respective gates, said applied voltage and said motor winding for controlling each said first and second SCRs, responsive to the respective timing of sensed zero-crossing events of said AC voltage and an AC current in said motor winding corresponding to said AC voltage, wherein said first and second SCRs, alternately triggered into a conductive state during each alternation of said AC voltage, are alternately inhibited from said conductive state for a time proportional to a measured difference in time between the time said AC voltage of the present said alternation across said motor winding passes through a first zero-crossing and the time said corresponding AC current of said present alternation in said motor winding passes through a second zero-crossing, said measured difference determined as the time difference between successive first and second interrupts corresponding to said times said sensed zero-crossing events of said AC voltage and said corresponding AC current are coupled to said trigger generator and compared with a continuously running time base.

2. A controller as defined in claim 1 wherein said respective gates of said first and second SCRs are coupled together through a resistor in series with a switch responsive to a trigger control signal generated by said trigger generator.

3. A controller as defined in claim 2 wherein said switch is a photosensitive triac responsive to a light signal controlled by said trigger control signal.

4. A controller as defined in claim 1 wherein said first SCR comprises a first gate drive circuit coupled between said first node and said gate of said first SCR and said second SCR comprises a second gate drive circuit coupled between said second node and said gate of said second SCR.

5. A controller as defined in claim 4 wherein said respective gates of said first and second SCRs are coupled together through a register in series with a switch responsive to a trigger control signal generated by said trigger generator.

6. A controller as defined in claim 5 wherein said switch is a photosensitive triac responsive to a light signal controlled by said trigger control signal.

7. A controller as defined in claim 4 wherein said first and second gate drive circuits each comprise a resistor coupled in parallel with a steering diode wherein the cathode terminal of said steering diode is coupled to the respective gate of said SCR.

8. A controller as defined in claim 1 wherein said first and second SCRs comprise a matched pair for controlling each phase of said motor winding.

9. A controller as defined in claim 1 comprising a resistor and capacitor in series coupled between said first node and said second node.

10. A controller as defined in claim 1 wherein said trigger generator comprises:

a first input for sensing said AC voltage applied to said motor winding;

a second input for sensing said AC current in said motor winding corresponding to said AC voltage applied to said motor winding;

an output for providing a trigger control signal for controlling each said first and second SCRs; and a control means including said continuously running time base and responsive to said first and second interrupts corresponding respectively to said first and second inputs for generating said trigger control signal.

11. A controller as defined in claim 10 wherein said first input comprises:

a divider circuit coupled from said first node to said first input for providing a sample of said AC voltage.

12. A controller as defined in claim 10 wherein said second input comprises:

isolation means having an input side coupled to said second node and an output side for providing a logic transition responsive to said zero-crossing of said AC current in the motor; and comparator means coupled between said output side of said isolation means and said second input.

13. A controller as defined in claim 12 comprising:

a filter for removing noise from said logic transition coupled between said output of said isolation means and said comparator means.

14. A controller as defined in claim 12 wherein said isolation means comprises:

an optocoupler having a bidirectional LED input side and a phototransistor output side.

15. A controller as defined in claim 12 wherein said comparator comprises:

a differential amplifier having first and second inputs wherein said logic transition is coupled to said first input; and a reference signal coupled to said second input.

16. A controller as defined in claim 10 wherein said control means comprises:
   means for measuring the elapsed time between said first interrupt occurring in a select phase of said AC voltage and said second interrupt during said select phase of said AC voltage;
   means for calculating according to a predetermined algorithm the product of said elapsed time and a predetermined factor; and
   means for generating said trigger control signal, within a first time interval following receipt of said second interrupt, said trigger control signal having a duration substantially equal to said product; wherein
   said first and second gate drive circuits are disabled for the duration of said trigger control signal.

17. A controller as defined in claim 16 wherein the duration of said trigger control signal is adjustable.

18. A controller as defined in claim 10 wherein said control means comprises:
   a single processing unit integrating control functions for all phases of said AC voltages for each winding of said AC induction motor.

19. A controller as defined in claim 1 comprising:
   a first capacitor coupled between each said first node and an earth ground; and
   a second capacitor coupled between each said second node and said earth ground.

20. A controller as defined in claim 1 comprising:
   a conductive shield surrounding said trigger generator and coupled to an earth ground.

21. A controller as defined in claim 20 comprising:
   a conductive shield, surrounding each conductor carrying signals corresponding to said first and second zero-crossings and each conductor carrying said trigger control signals, said conductive shield coupled to said earth ground.

22. A controller as defined in claim 1 wherein said first and second SCRs are inhibited from conduction by said trigger generator during a predetermined interval following each zero-crossing of said AC current during each alternation of said AC voltage.

23. A controller as defined in claim 18 wherein said predetermined interval is calculated responsive to said first and second interrupts.

24. A controller as defined in claim 19 wherein said first and second interrupts define a time interval proportional to the power factor of said AC induction motor.

25. A controller as defined in claim 4 wherein said first and second gate drive circuits are disabled by said trigger generator during a predetermined interval following each zero-crossing of said AC current during each alternation of said AC voltage.

26. A controller as defined in claim 25 wherein said predetermined interval is calculated responsive to said first and second interrupts.

27. A controller as defined in claim 26 wherein said first and second interrupts define a time interval proportional to the power factor of said AC induction motor.

28. A controller as defined in claim 1 wherein a resistor divider circuit connected between said first and second nodes is selectively held open for a definite time responsive to said measured difference to match said energy use with said load on said motor.

29. A controller as defined in claim 1 wherein a resistor divider circuit connected between said first and second nodes is selectively closed following a second elapsed time after said second zero-crossing.

30. A method of dynamically matching energy use by an AC induction motor to the load on the motor, the motor having at least one motor winding and an AC voltage applied thereacross, comprising the steps of:
   coupling a bidirectional, gate-controlled switch in series between the AC voltage connected to a first node and the at least one motor winding connected to a second node wherein the bidirectional, gate-controlled switch includes first and second gates, one for each polarity of the AC voltage applied to the switch and the motor;
   generating a trigger control signal for the first and second gates of the bidirectional, gate-controlled switch for controlling each polarity of the AC voltage responsive to the respective timing of sensed zero-crossing events of said AC voltage and an AC current in said motor winding corresponding to said AC voltage;
   allowing the bidirectional, gate-controlled switch to be alternately triggered into a conductive state each alternation of the AC voltage; and
   inhibiting the conduction of the bidirectional, gate-controlled switch during each alternation of the AC voltage for a time proportional to a measured difference in time between the time the AC voltage of the present alternation across the motor winding passes through a first zero-crossing and the time the corresponding AC current of the present alternation in the motor winding passes through a second zero-crossing, the measured difference determined as the time difference between successive first and second interrupts corresponding to the times the sensed zero-crossing events of the AC voltage and the corresponding AC current are compared with a continuously running time base.

31. A method as defined in claim 30 further comprising the step of:
   coupling the first and second gates together through a first resistor in series with a switch responsive to the trigger control signal.

32. A method as defined in claim 31 wherein the step of coupling comprises the steps of:
   coupling a first gate drive circuit between the first node and the first gate; and
   coupling a second gate drive circuit between the second gate and the second node.

33. A method as defined in claim 30 wherein the step of coupling comprises the step of:
   connecting first and second SCRs in parallel with each other in opposing polarities between the first and second nodes.

34. A method as defined in claim 30 wherein the step of generating comprises the steps of:
   sensing the AC voltage applied to the at least one motor winding and outputting the first interrupt corresponding to the first zero-crossing;
   sensing the AC current in the at least one motor winding corresponding to the AC voltage applied to the at least one motor winding and outputting the second interrupt corresponding to the second zero-crossing; and generating the trigger control signal, beginning within a first time interval following occurrence of the second interrupt and ending following an elapsed time proportional to the difference in time between the occurrence of the first interrupt and the occurrence of the second interrupt.

35. A method as defined in claim 31 wherein the step of inhibiting comprises the step of:

opening the switch in series with the first resistor coupling the first and second gates together.

* * * * *

UNITED STATES PATENT AND TRADEMARK OFFICE
CERTIFICATE OF CORRECTION

PATENT NO. : 6,400,119 B1
DATED : June 4, 2002
INVENTOR(S) : Garza et al.

It is certified that error appears in the above-identified patent and that said Letters Patent is hereby corrected as shown below:

Column 1,
Line 3, between "ENERGY CONSERVING MOTOR CONTROLLER" and "BACKGROUND OF THE INVENTION" insert -- This invention relates to control of AC powered electric machines. More particularly, it relates to power factor controllers for single phrase and three phase induction motors. --

Column 3,
Line 2, "zero crossing" should read -- zero-crossing --

Column 4,
Line 36, "12" should read -- $I_2$ --
Line 40, "13" should read -- $I_3$ --

Column 5,
Line 61, "13" should read -- $I_3$ --

Column 6,
Line 1, "13" should read -- $I_3$ --
Line 11, "accurate 15 time" should read -- accurate time --

Column 9,
Line 33, "the 10 cathode" should read -- The cathode --

Column 11,
Line 8, "21 1" should read -- 211 --
Line 29, "It" should read -- If, --

Signed and Sealed this

Twenty-second Day of October, 2002

Attest:

*Attesting Officer*

JAMES E. ROGAN
*Director of the United States Patent and Trademark Office*